No. 8,228. E. STEBBINS. MOLASSES GATE OR FAUCET. PATENTED JULY 15, 1851.
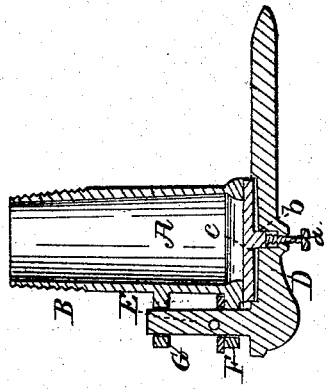
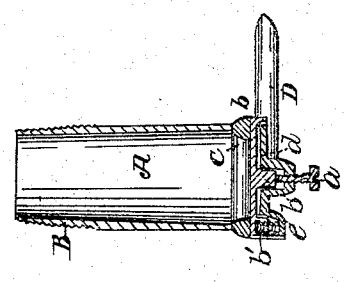
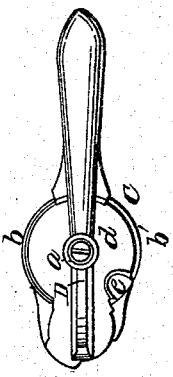
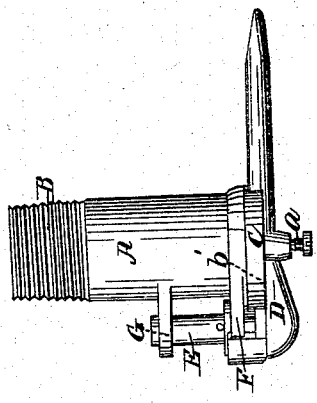

UNITED STATES PATENT OFFICE.

E. STEBBINS, OF CHICOPEE, MASSACHUSETTS.

MOLASSES GATE OR FAUCET.

Specification of Letters Patent No. 8,228, dated July 15, 1851.

*To all whom it may concern:*

Be it known that I, ERASTUS STEBBINS, of Chicopee, in the county of Hampden and State of Massachusetts, have invented a new and useful Improvement in Molasses-Faucets; and I do hereby declare that the same is fully described and represented in the following specification and accompanying drawing, letters, figures, and references thereof.

Of the said drawings, Figure 1, denotes a front end elevation of my improved molasses gate or faucet. Fig. 2, is a top side view or plan of it. Fig. 3, is a central, and longitudinal section of it. Fig. 4, is a longitudinal and central section of it, taken through the spring of the lever and gate to be hereinafter described.

In the said drawing, A, represents the screw tube of the faucet. Its rear end is provided with a screw B, while its front end is made as a seat for the valve plate or gate C, to rest and move against. D, is the lever of said gate, having its shaft E, supported in bearings or ears F, G, extended from the side of the screw tube A.

Instead of making the lever, and the valve or gate in one solid piece, in the usual way, I make them in separate pieces, and place them at a short distance apart from one another, and force the gate against its seat by means of a screw $a$, which is screwed through the lever, and against the central part of the gate or projection $b$, therefrom, allowing the plate or gate to pivot or rock on the end of the screw so as to readily accommodate itself to its seat when moved thereon. In order to keep the seat plate or valve in place, I provide it with a curved flanch $b'$, $b'$, which is made to extend from it, and inclose the circular part $d$, of the lever. Within a recess or chamber $e$, formed on the circular part $d$, and in the position thereon as shown in the drawing, I place a small helical spring $f$, to bear against the outer part of the gate, and preserve it in place when the gate is entirely opened, as well as to keep said gate tight against its seat, when it is closed. By using a rocker plate separate from the lever, and forced down by a spring pivoted as described. I am enabled to dispense with the usual ring of leather, such as is generally employed, to make a tight seat or joint. I also make a very cheap, durable, and easily constructed article.

What I claim as my invention, is—

The arrangement of the spring, which bears the gate against the seat, (said spring being arranged so as to bear against the outer edge instead of the central part of the gate) in connection with making the said gate separate from the lever, and to work on a projection or screw therefrom, essentially as specified.

In testimony whereof I have hereto set my signature, this eighth day of May A. D. 1851.

ERASTUS STEBBINS.

Witnesses:
R. H. EDDY,
R. FROTHINGHAM, Jr.